US012333952B2

(12) United States Patent
Zelman et al.

(10) Patent No.: US 12,333,952 B2
(45) Date of Patent: Jun. 17, 2025

(54) SYSTEM AND METHOD OF RESPONSE TO AN UNSTABLE APPROACH DURING AN APPROACH TO LANDING FOR AN AIRCRAFT

(71) Applicant: THE BOEING COMPANY, Chicago, IL (US)

(72) Inventors: Seth Micah Zelman, Manassas, VA (US); Brian Kenyon Rupnik, Lake Stevens, WA (US); Jeff D. Yoo, Bothell, WA (US); Jasper Patrick Corleis, Renton, WA (US); Kevin Leslie Gosling, Everett, WA (US); Michael Richard McGivern, Long Beach, CA (US)

(73) Assignee: THE BOEING COMPANY, Arlington, VA (US)

( * ) Notice: Subject to any disclaimer, the term of this patent is extended or adjusted under 35 U.S.C. 154(b) by 471 days.

(21) Appl. No.: 17/657,847

(22) Filed: Apr. 4, 2022

(65) Prior Publication Data

US 2023/0316937 A1 Oct. 5, 2023

(51) Int. Cl.
*G08G 5/54* (2025.01)
*G08G 5/21* (2025.01)
(Continued)

(52) U.S. Cl.
CPC ................. *G08G 5/54* (2025.01); *G08G 5/21* (2025.01); *G08G 5/34* (2025.01); *G08G 5/55* (2025.01); *G08G 5/59* (2025.01)

(58) Field of Classification Search
CPC .... G08G 5/025; G08G 5/0021; G08G 5/0039; G08G 5/006; G08G 5/54; G08G 5/21; G08G 5/34; G08G 5/55; G08G 5/59
See application file for complete search history.

(56) References Cited

U.S. PATENT DOCUMENTS 5,479,346 A * 12/1995 Lecomte ............... B64C 13/503 701/14
10,577,123 B1 * 3/2020 Kirtz ...................... G08G 5/025
(Continued)

FOREIGN PATENT DOCUMENTS

WO 2021154522 A1 8/2021

OTHER PUBLICATIONS

Honeywell Aerospace, "SmartRunway and SmartLanding," Terrain and Traffic Awareness, https://aerospace.honeywell.com/us/en/learn/products/terrain-and-traffic-awareness/smartrunway-and-smartlanding, retrieved Dec. 7, 2021, pp. 1-4.
(Continued)

*Primary Examiner* — Sohana Tanju Khayer
*Assistant Examiner* — Danielle M Jackson
(74) *Attorney, Agent, or Firm* — Moore IP Law

(57) ABSTRACT

A method includes determining, at a computing system of an aircraft, a target path for an approach to landing based on flight data. The method includes determining an approach phase of approach phases of the approach to landing. The method includes determining a real-time operational region of the aircraft for each monitored condition of monitored conditions based on the real-time aircraft data, the target path, and operational regions for each monitored condition. The method includes accessing notification content for a particular monitored condition for the approach phase. The real-time operational region for the particular monitored condition for the approach phase is outside of a target region of the particular monitored condition for the approach phase. The method also includes sending one or more notification signals based on the notification content from the computing system to one or more output systems.

20 Claims, 6 Drawing Sheets

(51) Int. Cl.

| | |
|---|---|
| ***G08G 5/34*** | (2025.01) |
| ***G08G 5/55*** | (2025.01) |
| ***G08G 5/59*** | (2025.01) |

(56) References Cited

U.S. PATENT DOCUMENTS

| | | | | |
|---|---|---|---|---|
| 2001/0052562 | A1 | 12/2001 | Ishihara et al. | |
| 2008/0300741 | A1 * | 12/2008 | Constans | G08G 5/54 701/16 |
| 2012/0253555 | A1 * | 10/2012 | Stange | G08G 5/0056 701/3 |
| 2014/0257602 | A1 | 9/2014 | Gaston | |
| 2016/0139597 | A1 * | 5/2016 | Letang | B64C 9/323 701/3 |
| 2017/0015434 | A1 | 1/2017 | McKay | |
| 2017/0036776 | A1 * | 2/2017 | He | G08G 5/025 |
| 2019/0122569 | A1 | 4/2019 | Villele et al. | |
| 2020/0150689 | A1 * | 5/2020 | Khatwa | B64D 45/04 |
| 2020/0258404 | A1 | 8/2020 | Thompson | |

OTHER PUBLICATIONS

Honeywell International, Inc., Product Description SmartRunway/SmartLanding Functions of the Enhanced Ground Proximity Warning System, Nov. 30, 2010, pp. 1-93.

International Air Transport Association (INTA), "Unstable Approaches," Risk Mitigation Policies, Procedures and Best Practices, 3rd Edition, 2017, pp. 1-52.

International Air Transport Association (INTA), "Unstable Approaches," Risk Mitigation Policies, Procedures and Best Practices, 2nd Edition, 2016, pp. 1-49.

Extended European Search Report for application No. 23161812.5 dated Sep. 6, 2023, pp. 1-9.

Examination Report for application No. 23161812.5 dated Mar. 7, 2025, pp. 1-7.

* cited by examiner

TABLE 400

OPERATIONAL REGIONS 404

| | -1 | -2 | -3 | 3 | 2 | 1 |
|---|---|---|---|---|---|---|
| 206 | NOTIFICATION CONTENT 410 | NOTIFICATION CONTENT 408 | | | | NOTIFICATION CONTENT 408 |
| 208 | NOTIFICATION CONTENT 410 | NOTIFICATION CONTENT 408 | | | | NOTIFICATION CONTENT 408 |
| 214 | NOTIFICATION CONTENT 410 | NOTIFICATION CONTENT 408 | NOTIFICATION CONTENT 406 | | NOTIFICATION CONTENT 406 | NOTIFICATION CONTENT 408 |
| 216 | NOTIFICATION CONTENT 410 | NOTIFICATION CONTENT 410 | NOTIFICATION CONTENT 408 | NOTIFICATION CONTENT 406 | NOTIFICATION CONTENT 408 | NOTIFICATION CONTENT 410 |
| 218 | NOTIFICATION CONTENT 412 | NOTIFICATION CONTENT 412 | NOTIFICATION CONTENT 410 | NOTIFICATION CONTENT 408 | NOTIFICATION CONTENT 412 | NOTIFICATION CONTENT 412 |
| 220 | NOTIFICATION CONTENT 412 | NOTIFICATION CONTENT 412 | NOTIFICATION CONTENT 410 | NOTIFICATION CONTENT 410 | NOTIFICATION CONTENT 412 | NOTIFICATION CONTENT 412 |

APPROACH PHASES 402

FIG. 4

SYSTEM AND METHOD OF RESPONSE TO AN UNSTABLE APPROACH DURING AN APPROACH TO LANDING FOR AN AIRCRAFT

FIELD OF THE DISCLOSURE

The present disclosure is related to systems and methods for responding to an unstable approach during an approach to landing for an aircraft.

BACKGROUND

An aircraft can include a flight management system to provide information to an operator of the aircraft (e.g., a pilot or a member of a flight crew), to perform tasks, or both, during flight phases of a flight. The flight phases include flight planning, pre-flight, engine start, taxi-out, take-off or reject take-off, initial climb, en route climb, cruise, descent, approach or go-around, landing, taxi-in, arrival and engine shut down, and post-flight.

The approach of the aircraft should be stable. A stable approach is an approach where particular flight parameters are controlled to within a specified range of values before the aircraft reaches a predefined altitude above a runway threshold where the aircraft is to land (e.g., 1000 feet, 500 feet, or other altitude) and the aircraft maintains the particular flight parameters within the specified range of values until the aircraft lands. The particular flight parameters include attitude, flight path trajectory, airspeed, rate of descent, engine thrust, and aircraft configuration. An unstable approach is an approach that is not a stable approach. When the approach is an unstable approach, a subsequent landing can be a rough landing, can cause injury to one or more people on the aircraft, can cause damage to cargo on the aircraft, can cause damage to the aircraft, or combinations thereof. Above the predefined altitude, an operator of the aircraft can use controls to change one or more flight characteristics to establish, or reestablish, a stable approach. If an approach is not stable by the predefined altitude, or if the approach becomes unstable below the predefined altitude, the operator of the aircraft should initiate a go-around instead of landing. The operator can initiate a go-around at any time above or below the predefined altitude until the aircraft lands and the speed of the aircraft is reduced below a speed sufficient to support flight of the aircraft (e.g., until thrust reversers are applied to reduce the speed of the aircraft).

SUMMARY

According to one implementation of the present disclosure, a method includes determining, at a computing system of an aircraft, a target path for an approach to landing based on flight plan data. The method includes determining, at the computing system based on real-time aircraft data, an approach phase of approach phases for the approach to landing. The method includes determining, at the computing system, a real-time operational region of the aircraft for each monitored condition of monitored conditions based on the real-time aircraft data, the target path, and operational regions for each monitored condition. The operational regions for a monitored condition of the monitored conditions for the approach phase include a target region defined by one or more first thresholds, a first end region defined by a second threshold, and at least one intermediate region between the target region and the first end region. The method includes accessing, at the computing system, notification content for a particular monitored condition for the approach phase. The real-time operational region for the particular monitored condition for the approach phase is outside of the target region of the particular monitored condition for the approach phase. The method also includes sending one or more notification signals based on the notification content from the computing system to one or more output systems.

According to another implementation of the present disclosure, an aircraft includes a plurality of sensors. The aircraft also includes a computing system to receive real-time aircraft data from the plurality of sensors, flight plan data, and thresholds associated with operational regions for monitored regions. The computing system is configured to execute instructions to determine a target path for an approach to landing based on the flight plan data. The computing system is configured to execute instructions to determine an approach phase of approach phases for the approach to landing. The computing system is configured to execute instructions to determine a real-time operational region of the aircraft for each monitored condition based on the real-time aircraft data, the target path, and the operational regions for each monitored condition of monitored conditions. The operational regions for a monitored condition of the monitored conditions for the approach phase include a target region defined by one or more first thresholds of the thresholds, a first end region defined by a second threshold of the thresholds, and at least one intermediate region between the target region and the first end region. The computing system is configured to execute instructions to access notification content for a particular monitored condition for the approach phase. The real-time operational region for the particular monitored condition for the approach phase is outside of the target region of the particular monitored condition for the approach phase. The computing system is also configured to execute the instructions to send one or more notification signals based on the notification content to one or more output systems.

According to another implementation of the present disclosure, a computer-readable storage device includes instructions that are executable by one or more processors. The instructions are executable by the one or more processors to determine a target path for an approach to landing based on flight plan data. The instructions are executable by the one or more processors to determine, based on real-time aircraft data, an approach phase of approach phases for the approach to landing. The instructions are executable by the one or more processors to determine a real-time operational region of the aircraft for each monitored condition of monitored conditions based on the real-time aircraft data, the target path, and operational regions for each monitored condition of monitored conditions. The operational regions for a monitored condition of the monitored conditions for the approach phase include a target region defined by one or more first thresholds and a first end region defined by a second threshold. The instructions are also executable by the one or more processors to automatically initiate a go-around responsive to the approach phase corresponding to a particular approach phase and a real-time operational region for a first monitored condition being in an end region of one or more end regions for the first monitored condition. An altitude of the aircraft for the particular approach phase is below a critical altitude.

The features, functions, and advantages that have been described can be achieved independently in various implementations or may be combined in yet other implementations, further details of which are disclosed with reference to the following description and drawings. The drawings are conceptual and not drawn to scale.

BRIEF DESCRIPTION OF THE DRAWINGS

FIG. 4 is a representation of a table of an approach database for a monitored condition of airspeed and an approach phase of an approach to landing.

DETAILED DESCRIPTION

Figure 1:
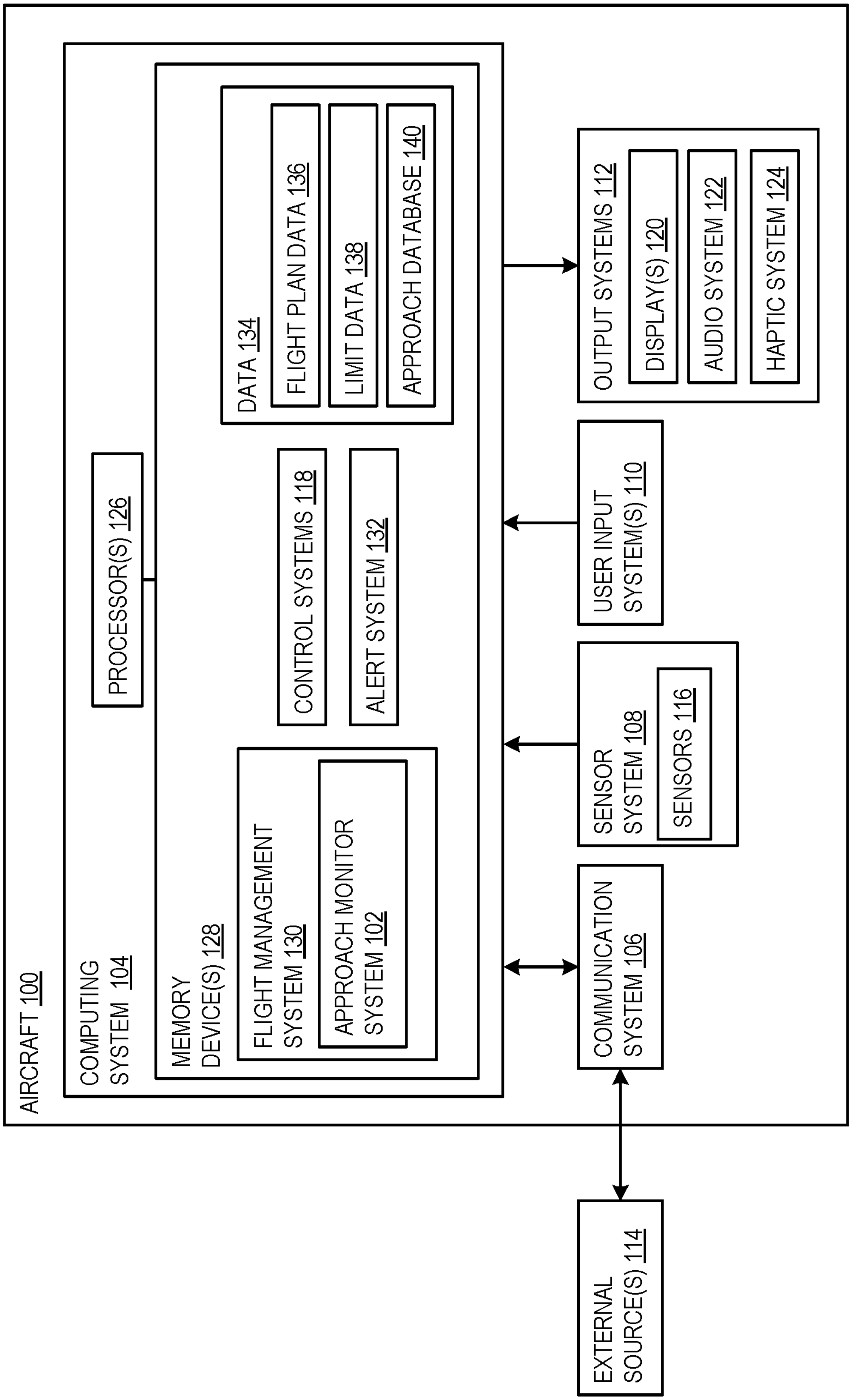
FIG. 1 is a block diagram of an aircraft that includes an approach monitor system.

An aircraft includes a flight management system that provides information to an operator of the aircraft, that performs tasks, or both, during flight phases of a flight of the aircraft. The operator of the aircraft can be aboard the aircraft or can remotely control the aircraft. In an implementation, the flight management system includes an approach monitor system that provides information to the operator of the aircraft, that performs tasks, or both, during an approach to landing of the aircraft.

The approach to landing of the aircraft includes several approach phases. Flight phases include a descent; an initial approach, where the aircraft is capturing and tracking a centerline of a runway and changing altitude to a final approach fix altitude; and a final approach, where the aircraft is descending from the final approach fix altitude with an intent to land on the runway. In an implementation, the approach phases include a portion of the descent, the initial approach, and several divisions of the final approach. The several divisions include final approach above a predefined altitude relative to a landing threshold (e.g., above 1000 feet, 500 feet, or some other predefined altitude relative to the landing threshold), final approach below the predefined altitude and above a critical altitude relative to the landing threshold (e.g., 100 feet, 75 feet, 30 feet, or some other altitude relative to the landing threshold), final approach below the critical altitude, and a landing flare. The predefined altitude can be based on visibility conditions during the approach. The critical altitude is an altitude below which control of the aircraft can be taken away from a human operator when the approach is an unstable approach to automatically initiate a go-around for safety of people on the aircraft, for safety of cargo on the aircraft, for safety of the aircraft, or combinations thereof. In other implementations, the approach phases can include fewer phases, more phases, different phases, or combinations thereof.

Information provided by the approach monitor system to an operator of an aircraft during a landing approach informs the operator when the approach deviates from a target path enough to classify the approach as an unstable approach. The information can be an alert, a caution, or a warning that presents a corrective action and informs the operator of an unstable condition (e.g., a corrective action of increasing the airspeed and an alert or caution that the approach is unstable due to low airspeed when an airspeed profile indicates that the airspeed is too low and the approach phase is the initial approach or final approach above the predefined altitude relative to the landing threshold). In some implementations, the approach monitor system automatically initiates a go-around when the altitude of the aircraft is below the critical altitude relative to the landing threshold and one or more monitored conditions indicate that the approach is an unstable approach.

When the approach monitor system is capable of automatically initiating a go-around, the approach monitor system can receive operator input that the approach is an emergency approach, or can automatically determine that the approach is an emergency approach (e.g., determine a low fuel condition or that one or more engines are non-functional resulting in an emergency approach). When the approach is an emergency approach, the approach monitor system does not provide notifications that the operator should initiate a go-around, and does not automatically initiate a go-around that would be automatically initiated if the approach was not an emergency approach.

In an implementation, the approach monitor system receives flight plan data and limit data. The flight plan data specifies a runway for landing and enables determination of a target path to the runway. The limit data includes thresholds that define operational regions associated with the monitored conditions for the approach phases. Values for the thresholds are based on safety limitations and performance limitations of the aircraft (e.g., stall speed, maneuvering speed, placard speeds, etc.), historical flight data, simulated flight data, or combinations thereof.

The monitored conditions include an airspeed profile, a path profile, an attitude profile, energy of the aircraft, configuration of the aircraft (e.g., throttle position, landing gear position, positions of the slats and flaps, etc.), runway condition, other profiles, other conditions, or combinations thereof. The operational regions for each monitored condition include a target region and a number of operational regions outside of the target region. The number of operational regions outside of the target region for a particular approach phase corresponds to a number of entries containing information for generating notification signals in an approach database for the monitored condition and the particular approach phase.

One or more first thresholds define a target region. One or more second thresholds define one or more end regions. A first threshold for a monitored condition for a flight phase and a second threshold for the monitored condition for the flight phase can be the same value. When a second threshold is different than a nearest first threshold, an intermediate region is defined between the first threshold and the second threshold. Also, when a third threshold is between a second threshold and a first threshold, two intermediate regions are between the end region and the target region. Additional third thresholds between the second threshold and the first threshold result in additional intermediate regions.

For some monitored conditions, there is only a single region outside of the target region. For example, the monitored condition of runway condition is a binary condition that indicates that the runway is available for use or that the runway is not available for use. The target region is that the runway is available for use and there is a single operational region outside of the target region corresponding to the runway is not available for use. Entries in the approach database for the monitored condition of runway availability can differ based on particular approach phases, and the content of the entries enables the approach monitor system to provide particular content and a style of presentation for notification of the unavailability of the runway to the operator of the aircraft or to automatically initiate a go-around.

The approach monitor system receives real-time information from sensors of the aircraft, ground based sensors, or both, and determines real-time aircraft data from the real-time information. The real-time aircraft data includes aircraft condition data and aircraft state data. The aircraft condition data includes warnings and failure indications for aircraft systems, alerts from external sources, position indicators for one or more adjustable aircraft components, or combinations thereof. The aircraft state data includes information indicative of altitude, position, course, attitude, airspeed, vertical speed, etc.

For each monitored condition based on the real-time aircraft data, the approach monitor system determines a real-time value for the monitored condition at a real-time altitude and determines a comparison value based on the real-time value for the monitored condition and a target value for the monitored condition. The approach monitor system also determines the real-time operational region of the aircraft for the flight phase based on the comparison value and the operational regions.

An event is indicated when a monitored condition is outside of a corresponding target region for the monitored condition. When there are multiple concurrent events for different monitored conditions, prioritization logic of the approach monitor system determines which event or events have priority and are to be further used to determine one or more notification signals. A number of notification signals based on different events to be presented to an operator is limited to a particular number (e.g., one, two, three, or some other number) when there are multiple concurrent events to avoid inundating the operator of the aircraft with too much information during the approach to landing. In an implementation when the number of notification signals for different events presented to the operator is limited, a notification provided to the operator informs the operator of the number of additional events so that the operator is aware that multiple events are present and that correction of an event associated with a notification signal presented to the operator will not necessarily result in a stable approach.

The prioritization logic includes a rule that an event corresponding to a monitored condition being in an end region is prioritized higher than any events corresponding to monitored conditions in intermediate regions. The approach monitor system includes additional prioritization logic to handle multiple concurrent events at the same level in order to give priority based on hazards associated with not correcting the events. Determination of the hazards is based on historical data, simulation data, safety analysis (e.g., a functional hazard assessment), or combinations thereof.

In some implementations, the approach monitor system provides an indication to the operator of the aircraft that the approach is a stable approach (e.g., indicia, a colored region, or both, that indicates that the approach is stable when all of the monitored conditions are in their respective target regions). In other implementations, the approach monitor system does not provide an indication to the operator of the aircraft that the approach is a stable approach to avoid providing distractions to the operator during the approach to landing. The operator would know that the approach to landing is stable when the approach monitor system does not provide an alert, a caution, or a warning to the operator during the approach to landing.

When one or more prioritized events are determined, the approach monitor system determines one or more notification signals. In an implementation, content to be included in the one or more notification signals and an emphasis to be provided to the content is retrieved from an approach database based on the real-time operational region associated with the event and based on the current approach phase during the approach to landing.

In an embodiment, notification content retrieved from the approach database is provided to an alert system. The alert system generates one or more notification signals and provides the one or more notification signals as output to the operator of the aircraft via output systems. The output causes information (e.g., notice that there is an event, a corrective action, and a cause of notification) to be presented visually, audibly, haptically, or combinations thereof, to the operator of the aircraft. The output is tiered output that can be an alert, a caution, or a warning. When the output is an alert, the output includes a first tone that indicates an alert and text provided to one or more display devices (e.g., a primary flight display) to describe a recommended action and a cause of the issue. When the output is a caution, the output includes a second tone indicating a caution, speech indicating a recommended action, and first emphasized text (e.g., text that is larger than normal text, text that is in italics, text that is bold, text in a color different than normal text, or combinations thereof) that describes the recommended action and the cause of the caution. When the output is a warning, the output includes a third tone that indicates a warning, speech indicating a recommended action, second emphasized text (e.g., text that includes one or more additional emphasis characteristics than the first emphasized text) that describes the recommended action and cause of the warning, and a haptic signal (e.g., stick shake or seat shake). The output provided by the alert system based on the notification signals can take other forms than the forms presented above with respect to alerts, cautions, and warnings. For example, in an implementation where the approach monitor system initiates an automatic go-around, the output provided by the alert system includes audio and emphasized text informing the operator that the go-around is initiated and subsequent information that control is returned to the operator after implementation of the go-around.

One advantage of the above-described implementations is that one or more notification signals are provided during an approach that are based on one or more monitored conditions being outside of target regions for the approach. The one or more notification signals include text, tones, speech, haptic signals, or combinations thereof, provided to the operator of the aircraft. The text, speech, or both, provides an action to take in light of an unstable approach (e.g., being outside of the target region for one or more monitored conditions for the current approach phase), an indication of a cause of the unstable approach, or both. When there are multiple concurrent events, the action is a prioritized action and one or more causes of the current events can be omitted to avoid inundating the operator of the aircraft with too much information. Emphasis provided by the notification signals increases as the real-time operational region for a monitored condition moves away from the target region into an intermediate region, or from the target region or an intermediate region into an end region. The end regions correspond to conditions during the approach that do not allow for a recovery, or a simple and easy recovery, to a target path or could result in undesired landing (e.g., a rough landing or damaging landing) if the approach is continued to a landing.

An additional advantage of some implementations is that a go-around can be automatically initiated by the approach monitor system. For example, when the altitude of the aircraft is below a critical altitude (e.g., 100 feet above a landing threshold or some other predetermined altitude) and a particular monitored condition of aircraft energy is in an end region, which indicates a probability that the aircraft cannot come to a stop before the end of the runway, the approach monitor systems takes control of the flight away from the operator, causes initiation of a go-around, alerts the operator that the go-around is initiated, and informs the operator when control of the aircraft is returned to the operator.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features referred to herein as a group or a type are referenced (e.g., when no particular one of the features is being referenced), the reference number is used without a distinguishing letter. However, when one particular feature of multiple features of the same type is referred to herein, the reference number is used with the distinguishing letter. For example, referring to FIG. 3, end regions 306A and 306B. When referring to a particular one of these end regions, such as the end region 306A, the distinguishing letter "A" is used. However, when referring to any arbitrary one of these end regions or to these end regions as a group, the reference number 306 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority, order, or arrangement of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a block diagram of an aircraft 100 with an approach monitor system 102 configured to respond to an unstable approach during an approach to landing for the aircraft 100. The aircraft 100 includes a computing system 104, a communication system 106, a sensor system 108, user input systems 110, output systems 112, other systems, or combinations thereof. For an aircraft 100 that can be remotely controlled, at least a portion of the user input systems 110 and at least a portion of the output systems 112 are external to the aircraft 100 and receive information from, and provide input to, the computing system 104 via the communication system 106.

A first portion of the communication system 106 is coupled to the computing system 104. The communication system 106 can also have a second portion that is independent of the computing system 104. The communication system 106 supports communication of voice and data with external sources 114. The external sources 114 can be air traffic control services, ground crew communication devices, weather information services, aircraft identification systems (e.g., automatic dependent surveillance-broadcast (ADS-B) systems), program update systems for software, data, or both, of the computing system 104, user input systems 110 and output systems 112 for an aircraft 100 that can be remotely controlled, other services, or combinations thereof.

The sensor system 108 provides sensor data from sensors 116 of the aircraft 100 to the computing system 104, to one or more instrument panels, or both. The sensor data provides information regarding aircraft conditions and status of aircraft systems. Aircraft condition data includes data corresponding to altitude, attitude, airspeed, vertical speed (e.g., ascent rate or descent rate), location, wind conditions, etc. Information for status of aircraft systems is information regarding the state of the aircraft (e.g., fuel level, engine temperatures, throttle position, landing gear position, flap and slat positions, etc.).

The user input systems 110 enable an operator (e.g., a pilot or crew member) of the aircraft 100 to provide input that controls operation of the aircraft 100. The user input systems 110 include steering controls, levers, buttons, dials, knobs, switches, one or more keyboards, one or more keypads, one or more touchscreens, one or more microphones, other input devices, or combinations thereof. Some of the user input systems 110 provide input to the computing system 104 and the computing system 104 implements one or more actions via one or more control systems 118 of the computing system 104 based on the input. Some of the user input systems 110 are directly coupled to control systems of the aircraft 100 to control one or more aircraft systems based on user input, and one or more of the sensors 116 provide data resulting from changes in flight conditions, flight configuration, or both, due to the user input to the computing system 104, the output systems 112, or both.

The output systems 112 provide information to the operator of the aircraft 100. The output systems 112 include one or more displays 120 (e.g., a primary flight display and one or more secondary flight displays) to display text (e.g., information associated with waypoints, alerts, cautions, warnings, etc.) and to display graphics associated with flight conditions (e.g., location information, altitude, attitude, speed, fuel, etc.), an audio system 122 (e.g., headphones or other auditory devices to provide sound to the operator), and a haptic system 124 (e.g., a seat shaker, a stick shaker, etc.). The output systems 112 can include additional output devices such as instrument panels, gauges, condition indicators, other devices, or combinations thereof.

The computing system 104 includes one or more processors 126 and one or more memory devices 128. The one or more memory devices 128 store instructions executable by the one or more processors 126 to perform operations. The instructions include a flight management system 130, the control systems 118, and an alert system 132. The flight management system 130 performs tasks to determine a target path of the aircraft 100 based on a flight plan, performs tasks to maintain the target path, or both, and the flight management system 130 provides information via the output systems 112 to the operator of the aircraft 100 to enable the operator to establish and maintain the target path or to take appropriate actions should a real-time path of the aircraft 100 deviate from the target path.

The flight management system 130 includes the approach monitor system 102 that is integrated into the flight management system 130 or is a separate program (e.g., set of instructions) that interfaces with the flight management system 130. The approach monitor system 102 monitors conditions during approach phases of an approach to landing. The approach monitor system 102 informs an operator of the aircraft 100 of one or more events (e.g., when one or more monitored conditions are outside of corresponding target regions), which indicates that the approach to landing is becoming unstable or is unstable. Information provided to the operator by the approach monitor system 102 is tiered to indicate an amount of deviation from the target regions of the monitored conditions, indicate a cause for providing the information, and provides a course of action for the operator to take. The course of action can be a corrective action to return toward conditions associated with a target path for the approach to landing or can inform the operator to initiate a go-around. In some implementations, the approach monitor system 102 automatically initiates a go-around during the approach to landing when the aircraft 100 is below a critical altitude and one or more of the monitored conditions are in regions that indicate an undesirable landing (e.g., a rough landing or a landing that results in damage) could occur if the aircraft 100 is allowed to continue to a landing.

The control systems 118 include instructions executable by the one or more processors 126 to receive input from one or more systems (e.g., the flight management system 130, the approach monitor system 102, the user input systems 110, other systems, or combinations thereof), and provide output to control one or more other systems of the aircraft (e.g., the communication system 106, flight configuration systems, other systems, or combinations thereof). The alert system 132 provides output via the output systems 112 to the operator of the aircraft 100.

The one or more memory devices 128 also include data 134 used by the one or more processors 126 when implementing the instructions. The data 134 includes flight plan data 136, limit data 138, and an approach database 140. The flight plan data 136 includes data that establishes the flight plan. The flight plan data enables the one or more processors 126 to determine the target path and target conditions for monitored conditions along the target path. For an approach to landing, the flight plan data 136 identifies an airport and a runway where the aircraft 100 is to land, and identifies an initial contact location of the runway for the landing.

The limit data 138 includes information about the runway that the aircraft 100 is to land on (e.g., elevation, length, etc.). The limit data 138 also includes thresholds for monitored conditions for approach phases. The thresholds are used to define operational regions for the monitored conditions for the approach phases.

The approach database 140 includes notification content for information to provide to the operator of the aircraft 100. The notification content includes information content and presentation information (e.g., particular notification tone; presentation style for text output (e.g., font size and emphasis characteristics); device, intensity, and duration of a haptic signal; etc.) for events that can occur during the approach to landing.

During operation of the aircraft 100, the flight management system 130 determines the target path to the runway where the aircraft 100 is to land. The target path to the runway is determined from the flight plan data 136 provided to the computing system 104. The flight plan data 136 is provided before flight of the aircraft 100 and is updated during the flight. The flight plan data 136 includes identifiers of a destination airport and a runway to be used for landing. When the operator of the aircraft 100 initiates an approach to landing, the flight management system 130 provides information and a graphic display to facilitate the operator to follow the target path and the flight management system 130 facilitates the approach monitor system 102 determining a state of the approach (e.g., stable or unstable) and handling of an unstable approach to landing.

Figure 2:
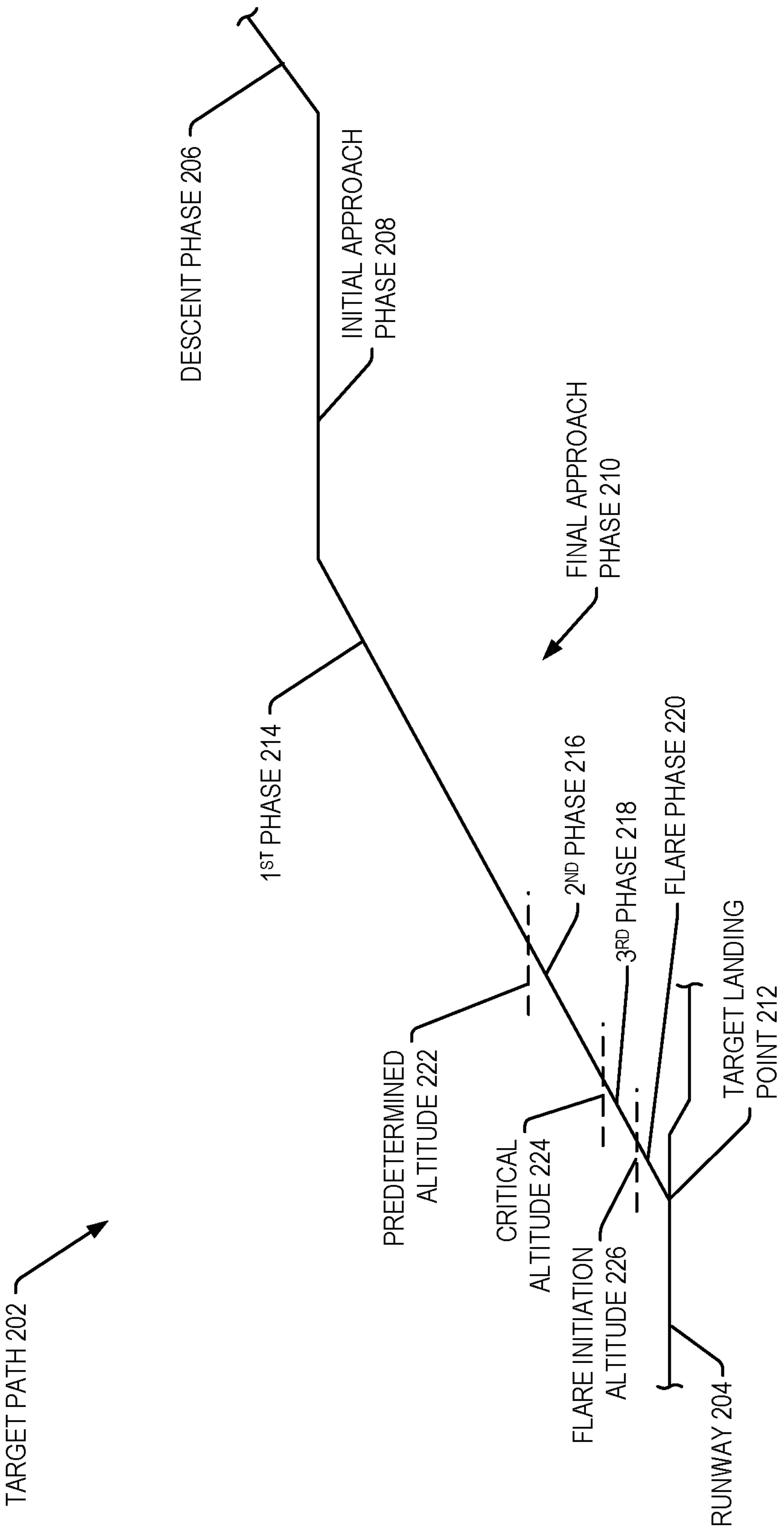
FIG. 2 is a diagram of a target path for an approach to landing.

FIG. 2 depicts a representation of a target path 202 to a runway 204. During a flight of the aircraft 100, the computing system 104 receives information from one or more external sources 114, from the operator of the aircraft 100 via the user input systems 110, or both, that is stored as flight plan data 136. When the flight plan data 136 is sufficient to determine the target path 202 to the runway 204, the target path 202 is determined by the flight management system 130 and provided to the approach monitor system 102.

The target path 202 includes a portion of a descent phase 206, an initial approach phase 208, a final approach phase 210 having a glide slope, and a target landing point 212 near a first end of the runway 204. The final approach phase 210 is separated into a set of phases including a first phase 214, a second phase 216, a third phase 218, and a flare phase 220. In other implementations, the final approach phase is separated into a different set of phases having fewer phases or more phases. When the aircraft 100 is in the first phase 214, the altitude of the aircraft 100 is between a start of the glide slope (e.g., an end of the initial approach phase 208) and a predetermined altitude 222. In some implementations, the predetermined altitude 222 is based on visibility conditions. When the visibility is low (e.g., the approach is an instrument approach), the predetermined altitude 222 is a first value (e.g., 1000 ft above a runway threshold) and when the visibility is high, the predetermined altitude 222 is a second value (e.g., 500 ft above the runway threshold). In other embodiments, the predetermined altitude has a different value than 1000 ft or 500 ft above the runway threshold.

When the aircraft 100 is in the second phase 216, the altitude of the aircraft 100 is at or below the predetermined altitude 222 down to a critical altitude 224. The critical altitude 224 can be 100 feet, 50 feet, 40 feet, or some other height above the runway threshold. In some implementations, the approach monitor system 102 cannot automatically initiate a go-around of the aircraft 100. In such implementations, the critical altitude 224 is not used or set. When the aircraft 100 is in the third phase 218, the altitude of the aircraft 100 is at or below the critical altitude 224. During the third phase 218, the approach monitor system 102 is able to automatically initiate a go-around in response to a determination by the approach monitor system 102 that one or more monitored conditions are in operational regions (e.g., end regions) that indicate that the approach is an unstable approach.

In some implementations before the aircraft 100 lands, the aircraft 100 enters a flare phase 220 at a flare initiation altitude 226. In the flare phase 220, a flare of the aircraft 100 is performed. For aircraft 100 where the critical altitude 224 is set, the approach monitor system 102 is able to automatically initiate a go-around during the flare phase 220 when the altitude is below the critical altitude 224.

Based on the target path 202, the approach monitor system 102 determines operational regions for monitored conditions for the approach phases 206, 208, 214-220 of the approach to landing. To determine the operational regions, the approach monitor system 102 retrieves or determines one or more thresholds from the limit data 138 for each monitored condition for each approach phase 206, 208, 214-220 of the approach to landing for the aircraft 100.

Figure 3:
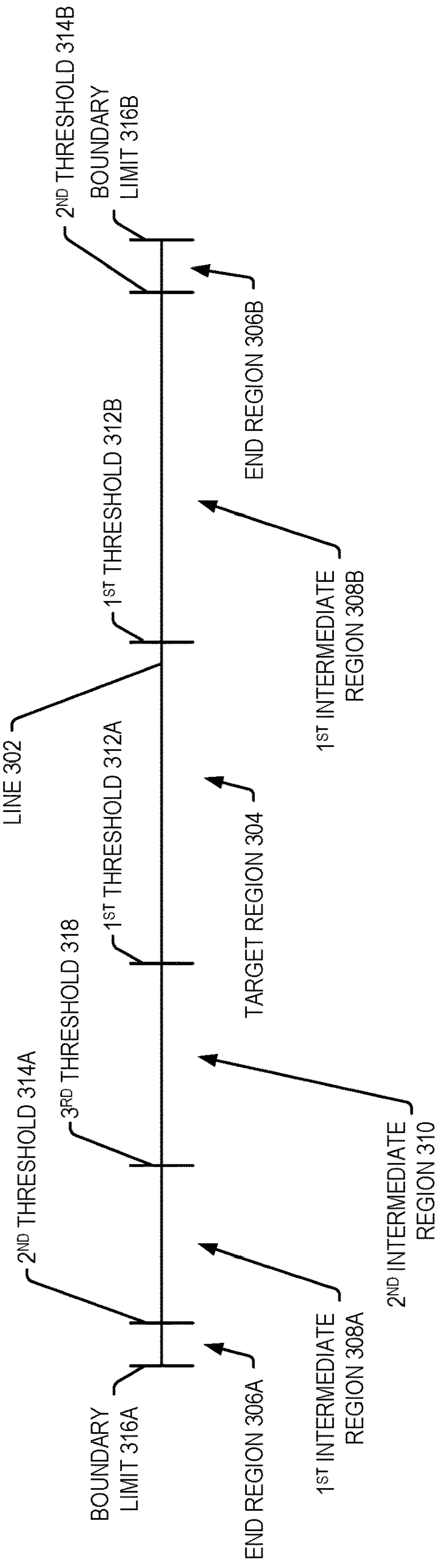
FIG. 3 is a diagram showing operational regions for a monitored condition of airspeed.

FIG. 3 depicts operational regions determined for a monitored condition of airspeed for the first phase 214 of the approach phases. Line 302 represents deviation from a target airspeed associated with the target path 202. The deviation for a monitored condition can be determined as a ratio of an actual value of a monitored condition to a target value of the monitored condition, a difference of the actual value of the monitored condition to the target value, or based on some other function. The operational regions include a target region 304; end regions 306A, 306B; first intermediate regions 308A, 308B, and a second intermediate region 310. The target region 304 is a region between first thresholds 312A, 312B. When the deviation of the monitored condition is in the target region 304, the approach is a stable approach and little or no correction associated with the monitored condition is needed for the aircraft 100 to follow the target path 202.

The end regions 306 are regions between second thresholds 314 and boundary limits 316. The boundary limits 316 are based on safety limitations and performance limitations of the aircraft (e.g., stall speed, maneuvering speed, placard speeds, etc.). During a flight of the aircraft 100, the flight management system 130, the approach monitor system 102, other systems, or combinations provide one or more warnings to the operator of the aircraft when a boundary limit 316 is approached or exceeded regardless of a particular flight phase of the aircraft 100.

For some monitored conditions for one or more of the approach phases, a first threshold 312 and a second threshold 314 have the same value. When the first threshold 312 is different than the second threshold 314, an intermediate region is defined between the first threshold 312 and the second threshold 314. When the deviation of the monitored condition is in an intermediate region, the approach is considered to be becoming unstable or unstable, and depending on the approach phase, the approach monitor system 102 will provide a warning, caution, or an alert, and a recommended course of action. The recommended course action is a course of action to correct the monitored condition when the deviation from the target region can be easily corrected or is an advisory to go-around when an undue amount of correction would be required to correct the monitored condition.

In FIG. 3, the operational regions include a first intermediate region 308A to the left of the target region 304 between the second threshold 314A and a third threshold 318 and a second intermediate region 310 between the third threshold 318 and the first threshold 312A. Also, the operational regions include a first intermediate region 308B to the right of the target region 304 between the first threshold 312B and the second threshold 314B.

The boundary limits 316A, 316B are based on safety limitations and performance limitations (e.g., stall speed, maneuvering speed, placard speeds, etc.) of the aircraft 100. The positions of the thresholds 312-316 are based on analysis of historical flight data, analysis of simulated flight data, or combinations thereof. Similar operational regions are determined for other approach phases for the monitored condition of airspeed and for each monitored condition for all of the approach phases based on thresholds that the approach monitor system 102 retrieves or determines from the limit data 138.

Each operational region outside of the target region 304 is associated with a number or other identifier that is used by the approach monitor system 102 to access notification content from the approach database 140. In an implementation, the target regions 304 are assigned an identifier of 0. Each end region 306A that is to the left of the target region 304 is assigned an identifier of −1, a first intermediate region 308A that abuts the end region 306A is assigned an identifier of −2, a second intermediate region 310 that abuts the first intermediate region 308A is assigned an identifier of −3, etc. Each end region 306B that is to the right of the target region 304 is assigned an identifier of 1, a first intermediate region 308B that abuts the end region 306B is assigned an identifier of 2, etc. The prioritization logic of the approach monitor system 102 uses the absolute value of the identifiers as priority levels when there are multiple events for a particular approach phase. In other implementations, other systems are used to identify the operational regions.

During the approach to landing, the approach monitor system 102 receives real-time condition data from the sensor system 108, the flight management system 130, or both. The real-time condition data enables the approach monitor system 102 to determine real-time values for the monitored conditions and an altitude of the aircraft 100. Based on the altitude and the target path 202, the approach monitor system 102 determines a target monitored condition for each monitored condition, a deviation of the real-time value of the monitored condition from the target monitored condition for each monitored condition, the current flight phase of the approach to landing, and an identifier of the real-time operational region for each monitored condition.

The approach monitor system 102 tracks temporal data for the monitored conditions to limit nuisance notifications based on one or more persistence thresholds. For example, the approach monitor system 102 stores a time when an operational region changes from the target region 304 to the first intermediate region 308B. If the time that the approach monitor system 102 detects the monitored condition is in the first intermediate region 308B is less than a first persistence threshold (e.g., 0.02 seconds, 0.05 seconds, or some other time), the real-time operational region is identified as the target region 304 until the first persistence threshold is exceeded. The value of the first persistence threshold for a transition from the target region 304 to one of the intermediate regions 308, 310 can be different than a second persistence threshold for a transition from an intermediate region 308, 310 to the target region 304. In some implementations, a persistence threshold is not used for transitions into one of the end regions 306 that do not result in an automatic go-around and satisfaction of a third persistence threshold (e.g., 0.1 seconds, 0.25 seconds, 0.5 seconds, or some other time) is needed before the approach monitor system 102 automatically initiates a go-around for transition into an end region 306 that does result in an automatic go-around.

In some implementations, the approach monitor system 102 stores data indicating a trend for each of the monitored conditions. If the trend for a monitored condition indicates that the monitored condition is going to transition from a first region to a second region and the monitored condition does transition between the two regions, the real-time operational region is identified as the second region even if the time in the second region does not exceed the persistence threshold associated with the transition between operational regions.

When all of the identifiers of the real-time operational regions indicate the monitored conditions are in the target regions 304, the approach to landing is a stable approach to landing. When one or more of the real-time operational regions for the monitored conditions are outside of the target regions 304 for the monitored conditions, one or more events are occurring and the approach is not a stable approach.

When there is a single event, prioritization logic of the approach monitor system 102 identifies the single event as a notification event. When there are multiple events, the prioritization logic of the approach monitor system 102 identifies an event of the events as the notification event. The prioritization logic determines which event is to be identified as the notification event by giving higher priority to regions farther away from the target regions 304 with a highest priority given to the end regions 306. When there are multiple events in a region with a highest determined priority, the prioritization logic gives higher priority to one or more particular events based on hazards associated with not correcting the one or more particular events. The hazards associated with not correcting the one or more particular events are determined by analysis of historical flight data, simulated flight data, or both. The prioritization logic identifies the event with the highest determined priority as the notification event. In some implementations, the approach monitor system 102 can identify more than one event (e.g., two events, three events, or some other number of events) as notification events.

The approach monitor system 102 accesses the approach database 140 to retrieve notification content for each notification event identified by the prioritization logic. In a particular implementation, each monitored condition has a corresponding table in the approach database 140. Rows of each table are associated with particular approach phases 206, 208, 214-220 of the approach to landing, and columns of each table are associated with particular operational regions 306-310 outside of the target regions 304. The approach monitor system 102 determines operational regions for the monitored conditions and approach phases so that the operational regions correspond to operational regions for entries present in the approach database 140 for each monitored condition for each approach phase.

During the approach to landing, the approach monitor system 102 determines real-time values for each of the monitored conditions and determines an identifier of the real-time operational region for each of the monitored conditions. When one or more events are present (i.e., one or more real-time operational regions are outside of corresponding target regions 304), the approach monitor system 102 identifies one or more notification events and retrieves notification content for the one or more notification events from the approach database 140 based on the operational regions for the one or more notification events and the current approach phase. The approach monitor system 102 provides a portion of the notification content associated with operator notification to the alert system 132. The alert system 132 generates one or more notification signals based on the portion of the notification content and provides the one or more notification signals to the output systems 112 to present information to the operator of the aircraft 100. When the notification content includes an instruction to initiate a go-around, the approach monitor system 102 provides one or more signals to the control systems 118 to temporarily stop operator initiated actions based on user input received via the user input systems 110, and to automatically (i.e., without input from the operator of the aircraft 100) initiate the go-around. After initiation of the go-around, control of the aircraft 100 is returned to the operator and the operator is informed that control has been returned to the operator.

FIG. 4 depicts a representation of a table 400 of the approach database 140 for the monitored condition of airspeed. Similar tables are present for each monitored condition. Rows of the table 400 correspond to approach phases 402 and columns of the table 400 correspond to operational regions 404. Content of cells of the table 400 include notification content 406 related to alerts, notification content 408 related to cautions, notification content 410 related to warnings, and notification content 412 for go-arounds automatically initiated by the approach monitor system 102. The notification content 406-412 identifies content to be presented via one or more of the output systems 112 to the operator of the aircraft 100, a presentation style of the content (e.g., font characteristics of text; duration of tones; and device, intensity, and duration of haptic output), or both. For notification content 406-410, the content identifies a tone to play via the audio system 122 that indicates a level of the notification, a haptic sensation, or both. The content may also include an action for the operator to take and a reason for taking the action presented as a text notification, a voice notification, or both. For example, the content to be presented includes text presented to a primary flight display of the displays 120 that states "Increase speed—airspeed low" for the notification content 406 of the cell corresponding to row 214 and column −3. The content to be presented includes text presented to the primary flight display that states "Go-Around—airspeed low" for the notification content 410 of the cell corresponding to row 216 and column −2 and "Go-Around—airspeed high" for the notification content 410 of the cell corresponding to row 216 and column 1. The notification content 412 includes an instruction that causes the approach monitor system 102 to provide one or more signals to the control systems 118 to automatically initiate a go-around. Particular content of the notification content 406-412 is determined from analysis of historical flight data, simulation flight data, or both.

Figure 5:
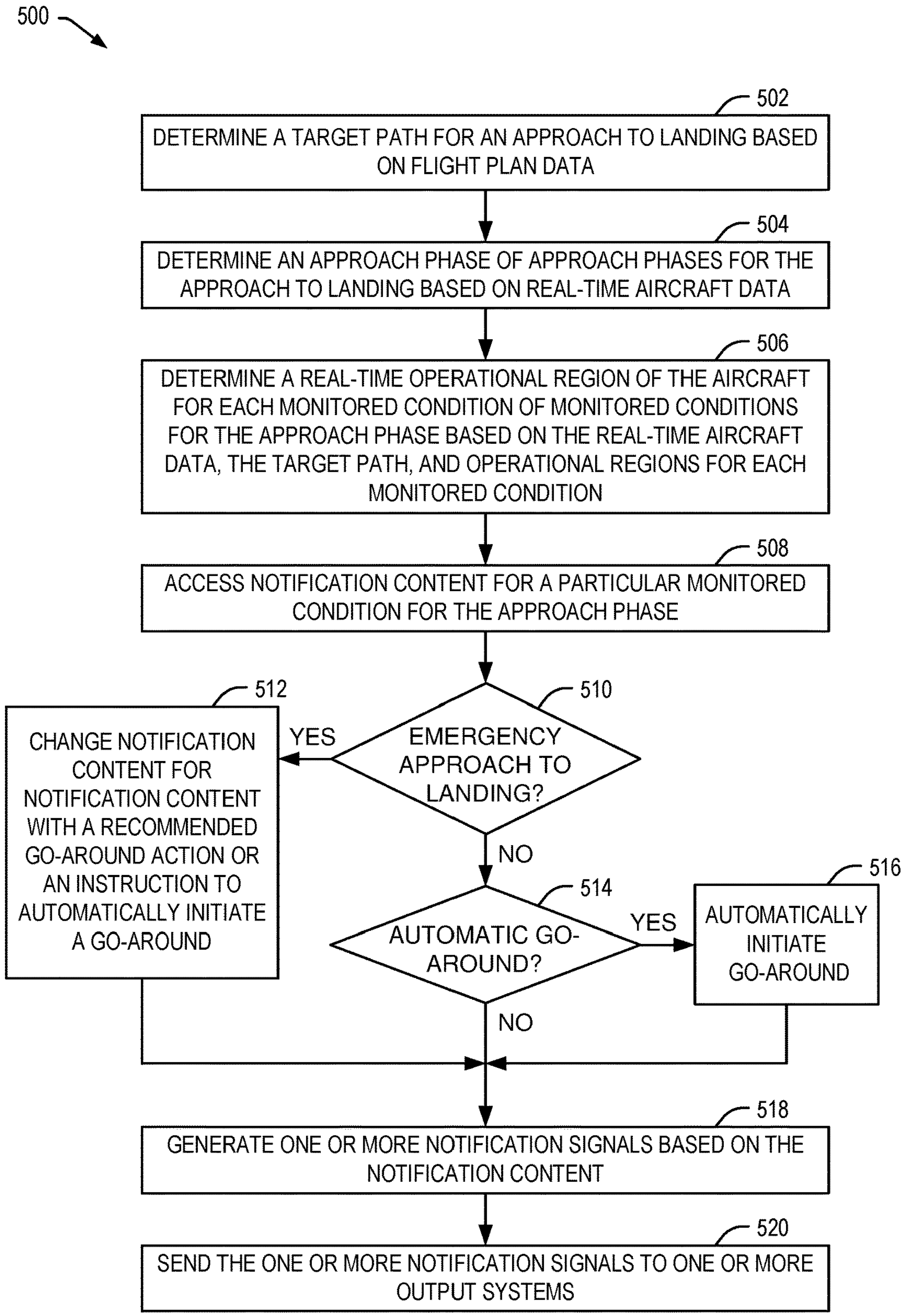
FIG. 5 is a flowchart of a first method of use of the approach monitor system of FIG. 1.

FIG. 5 is a flow chart of a method 500 of response to an unstable approach during an approach to landing of the aircraft 100. The method 500 is performed by the computing system 104 of the aircraft 100 using the approach monitor system 102. The method 500, at block 502, includes determining a target path 202 for an approach to landing based on flight plan data 136. The method 500, at block 504, includes determining an approach phase of the approach phases 206, 208, 214-220 for the approach to landing based on real-time aircraft data.

The method 500, at block 506, includes determining a real-time operational region of the aircraft for each monitored condition of the monitored conditions for the approach phase based on the real-time aircraft data, the target path 202, and operational regions 304-310 for each monitored condition. The operational regions 304-310 for a monitored condition for the approach phase include a target region 304 defined by one or more first thresholds 312, a first end region 306 defined by a second threshold 314, and at least one intermediate region 308 between the target region 304 and the first end region 306. If none of the monitored conditions are outside of corresponding target regions 304 for the monitored conditions, the method 500 ends if the aircraft lands or returns to block 504 and processes new real-time data if the aircraft has not landed.

The method 500, at block 508, includes accessing notification content 406-412 for a particular monitored condition for the approach phase. The real-time operational region for the particular monitored condition for the approach phase is outside of the target region 304 of the particular monitored condition for the approach phase. The notification content 406-412 content is accessed from the approach database 140.

The method, at block 510, determines if the approach to landing is an emergency approach to landing. The determination is based on operator input from the user input systems 110 that designates the approach to landing as an emergency approach or is determined based on the computing system 104 determining that one or more conditions indicate that the approach to landing is an emergency approach to landing based on conditions of the engine systems, condition of a landing gear system, fuel levels, conditions of other systems, or combinations thereof. If the approach to landing is an emergency approach to landing at block 510, the method 500 continues to block 512.

At block 512, the notification content for a notification content with a recommended go-around action is changed to remove the recommended go-around action. A substitute action that results in the monitored condition moving toward the target region 304 replaces the recommended go-around action. At block 512, the change notification content for a notification signal with an instruction to automatically initiate a go-around is changed to remove the instruction. Content of the notification content that informs of the automatic go-around and informs the operator when control is returned to the operator is replaced with substitute content of an action that results in the monitored condition moving toward the target region 304. The method 500 then continues to block 518.

If the approach to landing is not an emergency approach to landing at block 510, the method 500 continues to block 514. At block 514, the computing system 104 determines if the notification content includes an instruction to initiate an automatic go-around. If the notification content includes the instruction to initiate the automatic go-around at block 514, the method 500 continues to block 516. At block 516, the computing system 104 sends one or more signals to the control systems 118 to automatically initiate the go-around. In response to the instruction to initiate the automatic go-around, the computing system 104 takes control of the aircraft 100 and ignores input from the operator of the aircraft that contradicts the initiation of the go-around until the initiation of the go-around is complete. Initiating the go-around includes increasing airspeed, changing flap and slat positions, initiating a positive vertical speed, additional changes, or combinations thereof. The method 500 then continues to block 518.

If the notification content does not include the instruction to initiate the automatic go-around at block 514, or after block 512 or block 516, the method 500 continues to block 518. The method 500, at block 518, includes generating one or more notification signals based on the notification content. The method 500, at block 520, includes sending the one or more notification signals to one or more output systems 112. The one or more output systems 112 present information to the operator of the aircraft 100 that informs the operator of an unstable approach to landing and an action to take in response to the unstable approach to landing.

The method 500 ends after block 520 if the aircraft landed. If the aircraft did not land, and a go-around was not initiated, the method 500 returns to block 504 and processes new real-time data. If the aircraft did initiate a go-around, new flight plan data 136 is entered, and the method 500 restarts at block 502 when another approach to landing begins.

Figure 6:
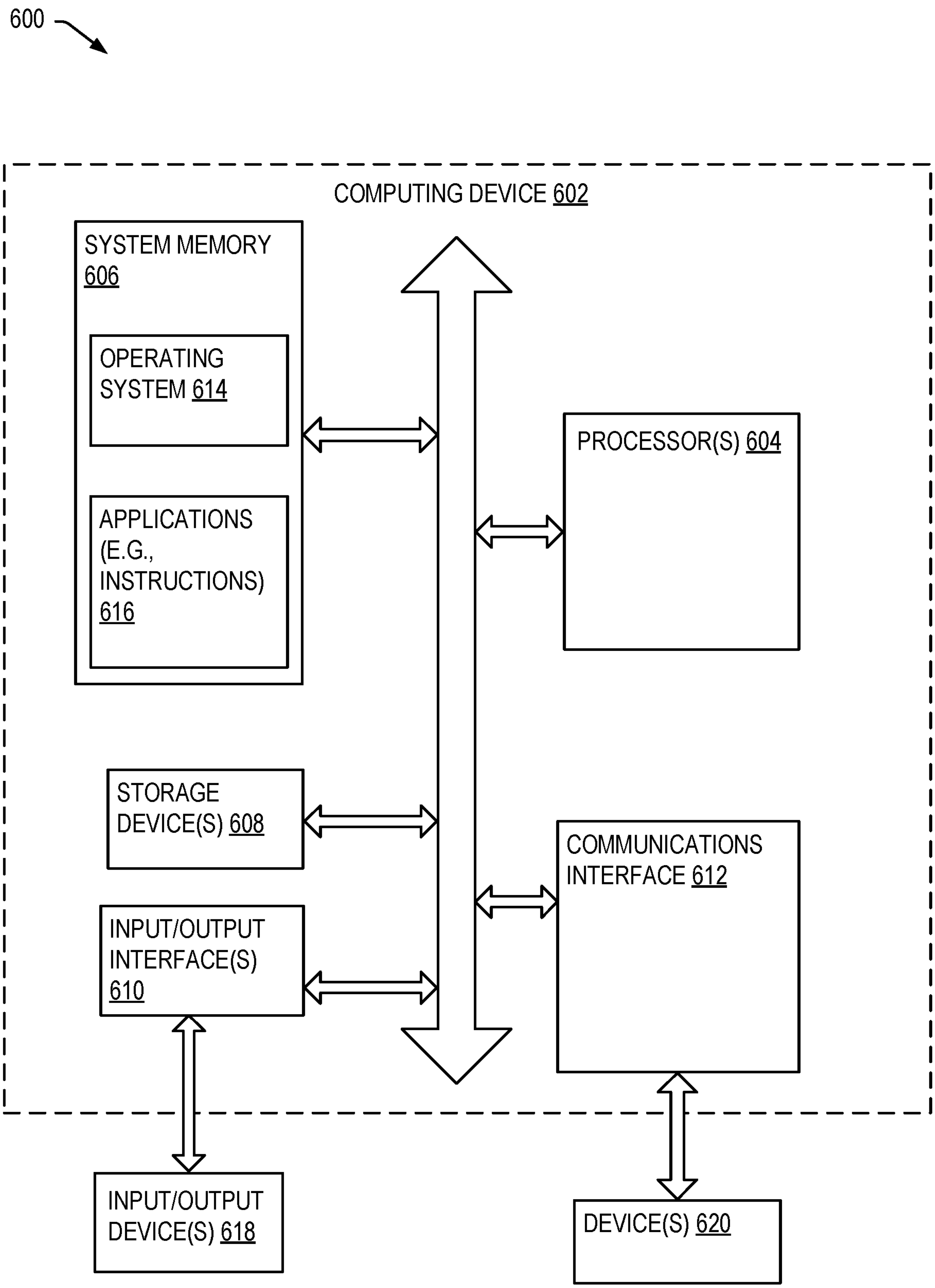
FIG. 6 is a diagram of a representation of a computing system that includes the approach monitor system of FIG. 1.

FIG. 6 is an illustration of a block diagram of a computing environment 600 including a general purpose computing device 602 configured to support implementations of computer-implemented methods and computer-executable program instructions (or code) according to the present disclosure. For example, the computing device 602, or portions thereof, may execute instructions to perform, or cause equipment to perform, operations described with reference to FIGS. 1-5. In an implementation, the computing device 602 is, or is a component of, the computing system 104 of the aircraft 100, the communication system 106, the sensor system 108, the user input systems 110, the output systems 112, or combinations thereof.

The computing device 602 includes a processor 604. In an implementation, the processor 604 includes the one or more processors 126 of FIG. 1. The processor 604 communicates with a system memory 606, one or more storage devices 608, one or more input/output interfaces 610, one or more communications interfaces 612, or a combination thereof. The system memory 606 includes non-transitory computer readable media, including volatile memory devices (e.g., random access memory (RAM) devices), nonvolatile memory devices (e.g., read-only memory (ROM) devices, programmable read-only memory, and flash memory), or both. The system memory 606 includes an operating system 614, which may include a basic input/output system for booting the computing device 602 as well as a full operating system to enable the computing device 602 to interact with users, other programs, and other devices. The system memory 606 includes one or more applications 616 (e.g., instructions) which are executable by the processor 604. In an implementation, the system memory 606 and the one or more storage devices 608 include the memory devices of FIG. 1, and the one or more applications 616 include the flight management system 130, the approach monitor system 102, the control systems, and the alert system 132 of FIG. 1.

The processor 604 communicates with the one or more storage devices 608. For example, the one or more storage devices 608 are non-transitory computer readable media that can include nonvolatile storage devices, such as magnetic disks, optical disks, or flash memory devices. The storage devices 608 can include both removable and non-removable memory devices. The storage devices 608 can be configured to store an operating system, images of operating systems, applications, and program data. In particular implementations, the system memory 606, the storage devices 608, or both, include tangible computer-readable media incorporated in hardware and which are not signals.

The processor 604 communicates with the one or more input/output interfaces 610 that enable the computing device 602 to communicate with one or more input/output devices 618 to facilitate user interaction. The input/output interfaces 610 can include serial interfaces (e.g., universal serial bus (USB) interfaces or Institute of Electrical and Electronics Engineers (IEEE) 1364 interfaces), parallel interfaces, display adapters, audio adapters, and other interfaces. The input/output devices 618 can include keyboards, pointing devices, displays, speakers, microphones, touch screens, and other devices. The processor 604 detects interaction events based on user input received via the input/output interfaces 610. Additionally, the processor 604 sends a display to a display device via the input/output interfaces 610. In some implementations, the input/output devices 618 include the user input systems 110 and the output systems 112 of FIG. 1.

The processor 604 can communicate with one or more devices 620 via the one or more communications interfaces 612. The one or more devices 620 can include computing devices external to the aircraft 100 and controllers, sensors, and other devices of the aircraft 100. The one or more communications interfaces 612 may include wired Ethernet interfaces, IEEE 802 wireless interfaces, other wireless communication interfaces, one or more converters to convert analog signals to digital signals, electrical signals to optical signals, one or more converters to convert received optical signals to electrical signals, or other network interfaces.

Aspects of the disclosure are described further with reference to the following set of interrelated clauses:

According to Clause 1, a method includes: determining, at a computing system of an aircraft, a target path for an approach to landing based on flight plan data; determining, at the computing system based on real-time aircraft data, an approach phase of approach phases for the approach to landing; determining, at the computing system, a real-time operational region of the aircraft for each monitored condition of monitored conditions for the approach phase based on the real-time aircraft data, the target path, and operational regions for each monitored condition, wherein the operational regions for a monitored condition of the monitored conditions for the approach phase include a target region defined by one or more first thresholds, a first end region defined by a second threshold, and at least one intermediate region between the target region and the first end region; accessing, at the computing system, notification content for a particular monitored condition for the approach phase, wherein the real-time operational region for the particular monitored condition for the approach phase is outside of the target region of the particular monitored condition for the approach phase; and sending one or more notification signals based on the notification content from the computing system to one or more output systems.

Clause 2 includes the method of Clause 1, wherein the approach phases include a descent, an initial approach, a final approach above a predefined point, and a final approach below the predefined point.

Clause 3 includes the method of Clause 1 or Clause 2, further including automatically initiating, by the computing system, a go-around responsive to the approach phase corresponding to a particular approach phase and a real-time operational region for a first monitored condition being in an end region of one or more end regions for the first monitored condition, and wherein an altitude of the aircraft for the particular approach phase is below a critical altitude.

Clause 4 includes the method of any of Clauses 1 to 3, wherein accessing the notification content comprises retrieving content of a notification signal from an approach database based on the real-time operational region for the particular monitored condition and the approach phase.

Clause 5 includes the method of any of Clauses 1 to 4, wherein the operational regions for a first monitored condition include a target region, a first end region, a first intermediate region between the first end region and the target region, and a second intermediate region between the first intermediate region and the target region.

Clause 6 includes the method of any of Clauses 1 to 5, wherein the one or more notification signals include a text notification for one or more displays, an aural tone, a voice notification, a haptic sensation, or combinations thereof.

Clause 7 includes the method of any of Clauses 1 to 6, wherein the real-time aircraft data comprises aircraft condition data and aircraft state data.

Clause 8 includes the method of Clause 7, wherein the aircraft condition data comprises warnings and failure indications for aircraft systems, alerts from external systems, position indicators for one or more adjustable aircraft components, or combinations thereof.

Clause 9 includes the method of Clause 7, wherein the aircraft state data comprises information indicative of altitude, position, course, attitude, airspeed, and vertical speed.

Clause 10 includes the method of any of Clauses 1 to 9, wherein the monitored conditions comprise speed, path, attitude, aircraft energy, aircraft configuration, runway status, or combinations thereof.

According to Clause 11, an aircraft includes: a plurality of sensors; and a computing system to receive real-time aircraft data from the plurality of sensors, flight plan data, and thresholds associated with operational regions for monitored conditions, wherein the computing system is configured to execute instructions to: determine a target path for an approach to landing based on the flight plan data; determine an approach phase of approach phases for the approach to landing; determine a real-time operational region of the aircraft for each monitored condition based on the real-time aircraft data, the target path, and the operational regions for each monitored condition of monitored conditions, wherein the operational regions for a monitored condition of the monitored conditions for the approach phase include a target region defined by one or more first thresholds of the thresholds, a first end region defined by a second threshold of the thresholds, and at least one intermediate region between the target region and the first end region; access notification content for a particular monitored condition for the approach phase, wherein the real-time operational region for the particular monitored condition for the approach phase is outside of the target region of the particular monitored condition for the approach phase; and send one or more notification signals based on the notification content to one or more output systems.

Clause 12 includes the aircraft of Clause 11, wherein a determination of the real-time operational region for a first monitored condition includes satisfaction of one or more persistence thresholds associated with a transition from a first operational region to a different operational region.

Clause 13 includes the aircraft of Clause 12, wherein the one or more persistence thresholds comprise a first persistence threshold associated with a time that a first monitored condition remains in a first operational region after transitioning from a second operational region to the first operational region.

Clause 14 includes the aircraft of Clause 12, wherein the one or more persistence thresholds are not applied for transitions into end regions of the operational regions.

Clause 15 includes the aircraft of any of Clauses 11 to 14, wherein the computing system is further configured to execute instructions to, in response to a determination that the approach to landing is an emergency approach to landing, inhibit the one or more notification signals from including a go-around warning.

According to Clause 16, a computer-readable storage device includes instructions, wherein the instructions are executable by one or more processors during an approach to landing of an aircraft to cause the one or more processors to: determine a target path for an approach to landing based on flight plan data; determine, based on real-time aircraft data, an approach phase of approach phases for the approach to landing; determine a real-time operational region of the aircraft for each monitored condition of monitored conditions based on the real-time aircraft data, the target path, and operational regions for each monitored condition of monitored conditions, wherein the operational regions for a monitored condition of the monitored conditions for the approach phase include a target region defined by one or more first thresholds and a first end region defined by a second threshold; and automatically initiate a go-around responsive to the approach phase corresponding to a particular approach phase and a real-time operational region for a first monitored condition being in an end region of one or more end regions for the first monitored condition, and wherein an altitude of the aircraft for the particular approach phase is below a critical altitude.

Clause 17 includes the computer-readable storage device of Clause 16, wherein the instructions are further executable by the one or more processors during the approach to landing to, in response to real-time operational regions for the monitored conditions corresponding to associated target regions, monitor the approach to landing without provision of one or more notification signals to an output system that inform an operator of the aircraft that the approach to landing is stable.

Clause 18 includes the computer-readable storage device of Clause 16 or Clause 17, wherein the instructions are further executable by the one or more processors during the approach to landing to, in response to one or more of the real-time operational regions for the monitored conditions exceeding the target regions above the critical altitude, send one or more notification signals to an output system, and wherein the one or more notification signals include an action for an operator of the aircraft to take.

Clause 19 includes the computer-readable storage device of any of Clauses 16 to 18, wherein the instructions are further executable by the one or more processors during the approach to landing to send one or more first notification signals to an output system that inform an operator of the aircraft that the go-around is automatically initiated.

Clause 20 includes the computer-readable storage device of Clause 19, wherein the instructions are further executable by the one or more processors during the approach to landing to send one or more second notification signals to the output system that inform the operator of the aircraft that control of the aircraft is returned to the operator.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:

determining, at a computing system of an aircraft, a target path for an approach to landing based on flight plan data;

determining, at the computing system based on real-time aircraft data, an approach phase of a plurality of approach phases for the approach to landing;

determining, at the computing system, a real-time operational region of the aircraft for each monitored condition of monitored conditions for the approach phase based on the real-time aircraft data, the target path, and operational regions for each monitored condition, wherein the operational regions for a particular monitored condition of the monitored conditions for the approach phase include a target region defined by one or more first thresholds, a first end region defined by a second threshold, and at least one intermediate region between the target region and the first end region;

accessing, at the computing system, notification content for each particular monitored condition for the approach phase, wherein the real-time operational region for the particular monitored condition for the approach phase is outside of the target region of the particular monitored condition for the approach phase, wherein a first real-time operational region for the particular monitored condition corresponds to first particular notification content during a first approach phase, and wherein the first real-time operation region for the particular monitored condition corresponds to second particular notification content during a second approach phase;

sending one or more notification signals based on the notification content from the computing system to one or more output systems; and automatically initiating, by the computing system, a go-around responsive to the approach phase corresponding to a particular approach phase and a real-time operational region for a first monitored condition being in an end region of one or more end regions for the first monitored condition, and wherein an altitude of the aircraft for the particular approach phase is below a critical altitude.

2. The method of claim 1, wherein the plurality of approach phases include a descent, an initial approach, a final approach above a predefined point, and a final approach below the predefined point.

3. The method of claim 1, wherein the first real-time operation region for the particular monitored condition corresponds to third particular notification content during a third approach phase.

4. The method of claim 1, wherein accessing the notification content comprises retrieving content of a notification signal from an approach database based on the real-time operational region for the particular monitored condition and the approach phase.

5. The method of claim 1, wherein the operational regions for a first monitored condition include a target region, a first end region, a first intermediate region between the first end region and the target region, and a second intermediate region between the first intermediate region and the target region.

6. The method of claim 1, wherein the one or more notification signals include a text notification for one or more displays, an aural tone, a voice notification, a haptic sensation, or combinations thereof.

7. The method of claim 1, wherein the real-time aircraft data comprises aircraft condition data and aircraft state data.

8. The method of claim 7, wherein the aircraft condition data comprises warnings and failure indications for aircraft systems, alerts from external systems, position indicators for one or more adjustable aircraft components, or combinations thereof.

9. The method of claim 7, wherein the aircraft state data comprises information indicative of altitude, position, course, attitude, airspeed, and vertical speed.

10. The method of claim 1, wherein the monitored conditions comprise speed, path, attitude, aircraft energy, aircraft configuration, runway status, or combinations thereof.

11. An aircraft comprising:

a plurality of sensors; and a computing system to receive real-time aircraft data from the plurality of sensors, flight plan data, and thresholds associated with operational regions for monitored conditions, wherein the computing system is configured to execute instructions to:

determine a target path for an approach to landing based on the flight plan data;

determine an approach phase of a plurality of approach phases for the approach to landing;

determine a real-time operational region of the aircraft for each monitored condition based on the real-time aircraft data, the target path, and the operational regions for each monitored condition of monitored conditions, wherein the operational regions for a particular monitored condition of the monitored conditions for the approach phase include a target region defined by one or more first thresholds of the thresholds, a first end region defined by a second threshold of the thresholds, and at least one intermediate region between the target region and the first end region;

access notification content for the particular monitored condition for the approach phase, wherein the real-time operational region for the particular monitored condition for the approach phase is outside of the target region of the particular monitored condition for the approach phase, wherein a first real-time operational region for the particular monitored condition corresponds to first particular notification content during a first approach phase, and wherein the first real-time operation region for the particular monitored condition corresponds to second particular notification content during a second approach phase;

send one or more notification signals based on the notification content to one or more output systems; and automatically initiate a go-around responsive to the approach phase corresponding to a particular approach phase and a real-time operational region for a first monitored condition being in an end region of one or more end regions for the first monitored condition, and wherein an altitude of the aircraft for the particular approach phase is below a critical altitude.

12. The aircraft of claim 11, wherein a determination of the real-time operational region for a first monitored condition includes satisfaction of one or more persistence thresholds associated with a transition from a first operational region to a different operational region.

13. The aircraft of claim 12, wherein the one or more persistence thresholds comprise a first persistence threshold associated with a time that the first monitored condition remains in a first operational region after transitioning from a second operational region to the first operational region.

14. The aircraft of claim 12, wherein the one or more persistence thresholds are not applied for transitions into end regions of the operational regions.

15. The aircraft of claim 11, wherein the computing system is further configured to execute instructions to, in response to a determination that the approach to landing is an emergency approach to landing, inhibit the one or more notification signals from including a go-around warning.

16. A non-transitory computer-readable medium comprising instructions, wherein the instructions are executable by one or more processors during an approach to landing of an aircraft to cause the one or more processors to:

determine a target path for an approach to landing based on flight plan data;

determine, based on real-time aircraft data, an approach phase of a plurality of approach phases for the approach to landing;

determine a real-time operational region of the aircraft for each monitored condition of monitored conditions based on the real-time aircraft data, the target path, and operational regions for each monitored condition of monitored conditions, wherein the operational regions for a particular monitored condition of the monitored conditions for the approach phase include a target region defined by one or more first thresholds and a first end region defined by a second threshold;

access notification content for the particular monitored condition for the approach phase, wherein the real-time operational region for the particular monitored condition for the approach phase is outside of the target region of the particular monitored condition for the approach phase, wherein a first real-time operational region for the particular monitored condition corresponds to first particular notification content during a first approach phase, and wherein the first real-time operation region for the particular monitored condition corresponds to second particular notification content during a second approach phase; and automatically initiate a go-around responsive to the approach phase corresponding to a particular approach phase and a real-time operational region for a first monitored condition being in an end region of one or more end regions for the first monitored condition, and wherein an altitude of the aircraft for the particular approach phase is below a critical altitude.

17. The non-transitory computer-readable medium of claim 16, wherein the instructions are further executable by the one or more processors during the approach to landing to, in response to real-time operational regions for the monitored conditions corresponding to associated target regions, monitor the approach to landing without provision of one or more notification signals to an output system that inform an operator of the aircraft that the approach to landing is stable.

18. The non-transitory computer-readable medium of claim 16, wherein the instructions are further executable by the one or more processors during the approach to landing to, in response to one or more of the real-time operational regions for the monitored conditions exceeding a particular target region above the critical altitude, send one or more notification signals to an output system, and wherein the one or more notification signals include an action for an operator of the aircraft to take.

19. The non-transitory computer-readable medium of claim 16, wherein the instructions are further executable by the one or more processors during the approach to landing to send one or more first notification signals to an output system that inform an operator of the aircraft that the go-around is automatically initiated.

20. The non-transitory computer-readable medium of claim 19, wherein the instructions are further executable by the one or more processors during the approach to landing to send one or more second notification signals to the output system that inform the operator of the aircraft that control of the aircraft is returned to the operator.

* * * * *